United States Patent [19]

Kirma et al.

[11] Patent Number: 4,752,998

[45] Date of Patent: Jun. 28, 1988

[54] PROCESS AND DEVICE FOR ATTACHMENT OF IDENTIFICATION PLATES, PARTICULARLY TO ELECTRICAL DISTRIBUTOR COMPONENTS, AND IDENTIFICATION PLATE TO BE THEREBY ATTACHED

[76] Inventors: Safa Kirma; Reiner Wurth; Heinz Penz, all of c/o MBB GmbH, P.O. Box 80 11 09, 8000 Muenchen 80, Fed. Rep. of Germany

[21] Appl. No.: 669,623

[22] Filed: Nov. 8, 1984

[30] Foreign Application Priority Data

Nov. 12, 1983 [DE] Fed. Rep. of Germany ..... 33411107

[51] Int. Cl.$^4$ .......... B23P 17/00; B23P 19/04; B23Q 7/10

[52] U.S. Cl. .......... 29/417; 29/433; 29/816

[58] Field of Search .......... 29/433, 229, 417, 464, 29/816

[56] References Cited

U.S. PATENT DOCUMENTS

| | | | |
|---|---|---|---|
| 3,157,941 | 11/1964 | White | 29/433 |
| 3,624,867 | 12/1971 | Reynolds | 29/417 |
| 3,681,839 | 8/1972 | Janecka | 29/229 |
| 3,846,900 | 11/1974 | Weglage | 29/229 |
| 4,060,286 | 11/1977 | Boice | 29/433 |
| 4,160,317 | 7/1979 | Sergeant | 29/816 |

FOREIGN PATENT DOCUMENTS

| | | |
|---|---|---|
| 1824051 | 12/1960 | Fed. Rep. of Germany . |
| G8306471 | 6/1983 | Fed. Rep. of Germany . |

*Primary Examiner*—Howard N. Goldberg
*Assistant Examiner*—Irene Cuda
*Attorney, Agent, or Firm*—W. G. Fasse; D. H. Kane, Jr.

[57] ABSTRACT

A process and device for attachment of identification plates to an electrical distributor component, initially interconnected plates forming strips that can be inserted into the device, which has at least one storage groove and from which, by means of a thumbpiece 6, a plate can be introduced into a receiving groove in the distributor component. The plates themselves have a narrowed guide portion which facilitates finding the storage groove.

9 Claims, 4 Drawing Sheets

FIG. 5
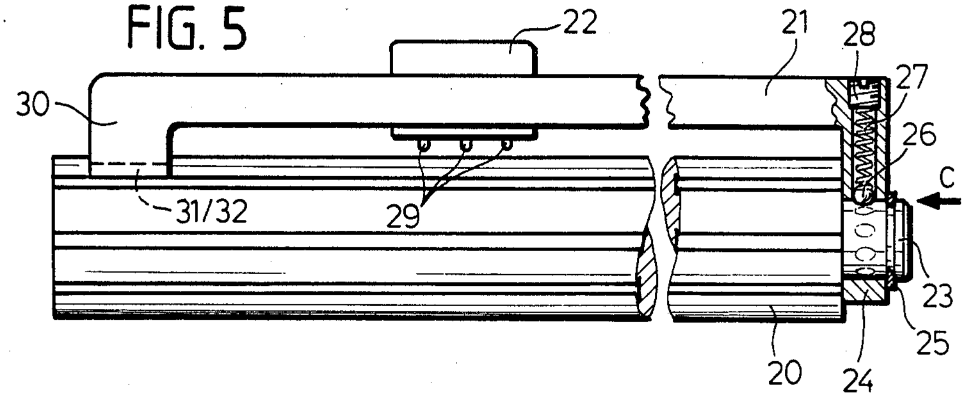
FIG. 6
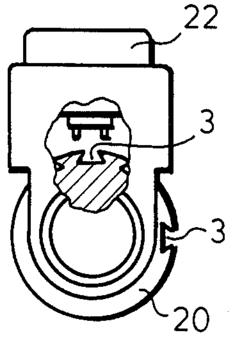
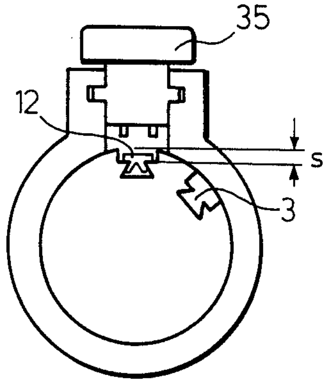
FIG. 8
FIG. 7
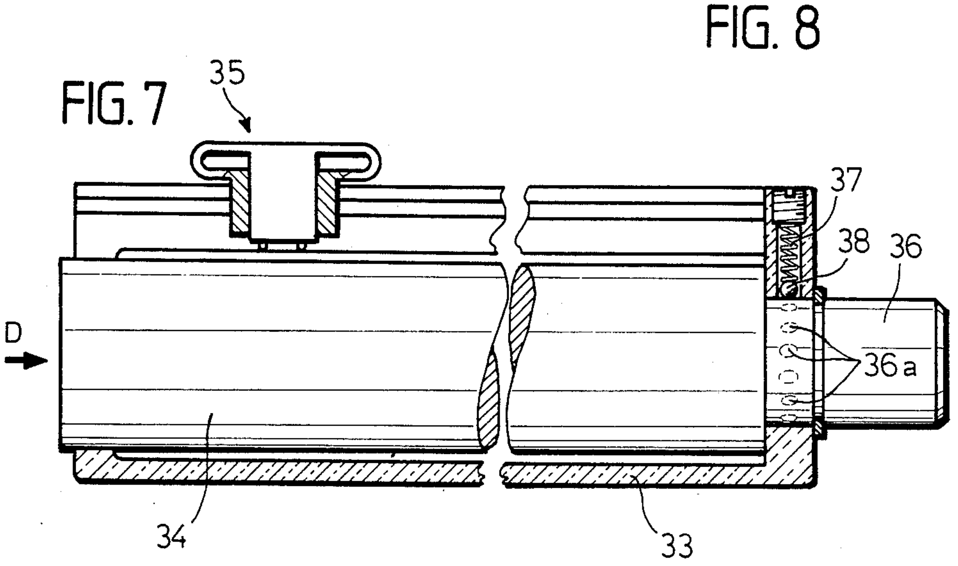

PROCESS AND DEVICE FOR ATTACHMENT OF IDENTIFICATION PLATES, PARTICULARLY TO ELECTRICAL DISTRIBUTOR COMPONENTS, AND IDENTIFICATION PLATE TO BE THEREBY ATTACHED

FIELD OF THE INVENTION

The invention relates to a process and a device for the attachment of identification plates, particularly to electrical distributor components, for aircraft and space vehicles, and to an identification plate to be thereby attached.

DESCRIPTION OF THE PRIOR ART

An identification plate of this kind is about 4 mm wide and 3 mm high. The dimensions and tolerances of the grooves accommodating these plates are determined, for example, by aviation standard LN 65 093, Part 2. The grooves in question can be dovetailed or T-shaped or of any other equally suitable shape. A known version of an identification plate of the aforementioned kind consists of a thin plastic slab pushed into the appropriate receiving groove from one side, the smallness of the plates necessitating the use of pincers. The rectangular plate is constructed to surplus dimensions in order to cause it to bulge slightly and enable it to be secured in the groove by friction. This procedure suffers from the following drawbacks:

(1) Owing to inaccuracies in manufacture certain plates rest in the groove so firmly that it is hardly possible to insert them with pincers, while others remain loose.

(2) In order to secure the loose plates firmly as well the use of an adhesive had to be adopted in addition.

(3) This method is expensive and therefore unsuitable for quantity production.

Another identification plate has become known under the term "dekafix", made by the firm of Weidmueller, of Detmold. The rear of the plate in question is fitted with two elastic claw-shaped holding devices spread apart, serving to secure the identification plate when it is pressed into the recess provided for the purposes of the apparatus to be identified by the plate. This plate, measuring 6.5×6.5 mm, is likewise still very small. Its insertion nevertheless involves no difficulties, owing to the fact that it is inserted from the front instead of from the side. Any inaccuracies in manufacture are balanced out by the elastic claw-shaped holding devices. The fact that it is insertable from the front, however, involves the drawback that the force with which it is secured is only slight. This solution is therefore unsuitable for adoption in aircraft construction. For this purpose greater holding forces are required, which can only be obtained by inserting the plate into the receiving groove from the side.

OBJECT OF THE INVENTION

The purpose of the invention is therefore to provide a process and a device for the attachment of identification plates, particularly to electrical distributor components, and also an identification plate to be thereby attached, which will enable the plate to be attached with the minimum of effort and expense and also ensure that the required holding forces will in all cases be obtained despite the unavoidable inaccuracies in production.

SUMMARY OF THE INVENTION

This aim is achieved, in the objects of the category indicated in claims 1 and 2, as a result of the characteristic features defined in relation thereto. Further embodiments of the invention are indicated in the dependent claims.

BRIEF DESCRIPTION OF THE DRAWINGS

The invention is illustrated in the drawing and explained in greater detail by reference to the description. The Figures show:

FIG. 5: A device with a barrel-shaped handpiece.

FIG. 6: View C of the device shown in FIG. 5.

FIG. 7: A device with a cylindrical housing.

FIG. **8*a*:** A device with a housing having perforations.

Figure 9:
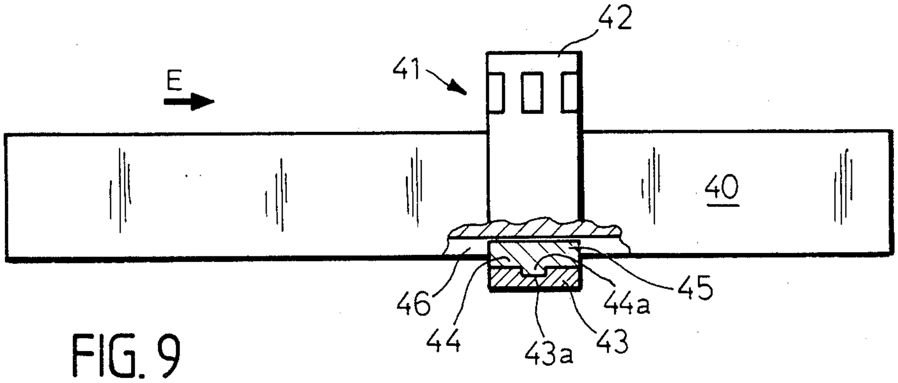

FIG. 9: A device having a thumbpiece with a transversal guide.

Figure 10:
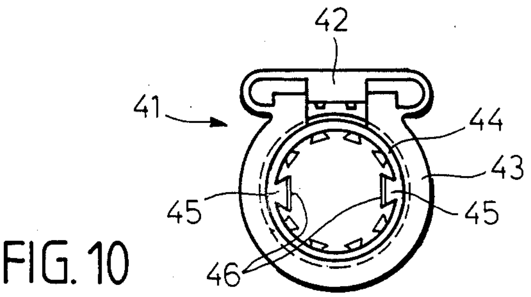

FIG. 10: View E of the device shown in FIG. 9.

Figure 11:
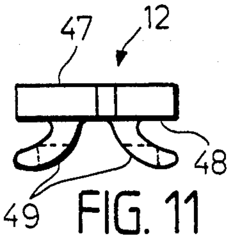
Figure 12:
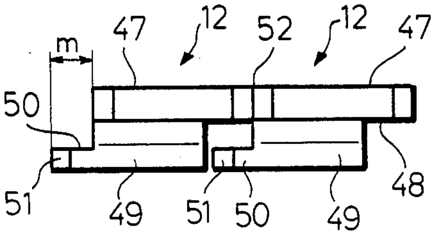
Figure 13:
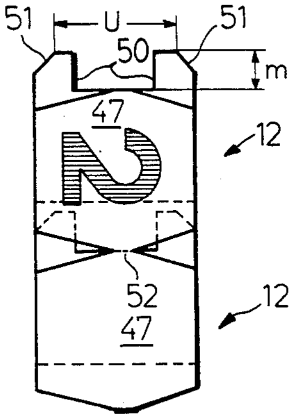

FIGS. 11–13: Two asymmetrical plates.

Figure 14:
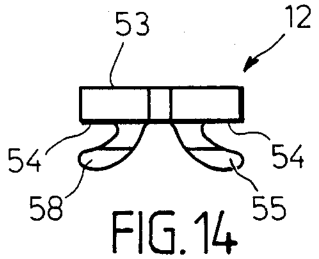
Figure 15:
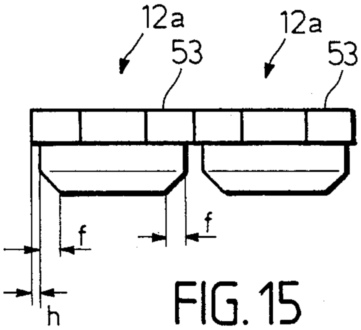
Figure 16:
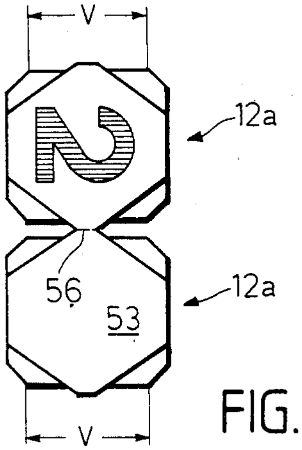

FIGS. 14–16: Two symmetrical plates.

DETAILED DESCRIPTION OF PREFERRED EXAMPLE EMBODIMENTS AND OF THE BEST MODE OF THE INVENTION

Figure 1:
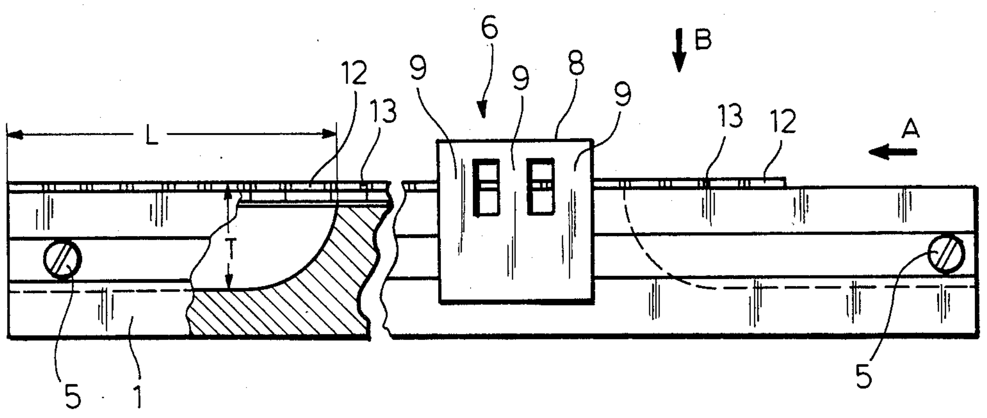
FIG. 1: A side view of a device for the attachment of identification plates.
Figure 2:
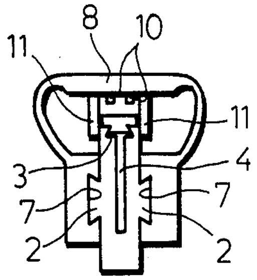
FIG. 2: View A of the device shown in FIG. 1.
Figure 3:
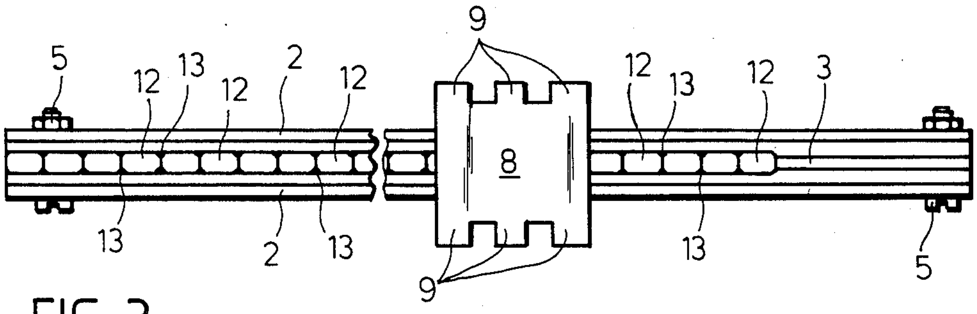
FIG. 3: View B of the device shown in FIG. 1.

FIGS. 1–3 show three views of a device with a handpiece 1, two guide bars 2 and a storage groove 3. The groove 3 is deepened at each end of the handpiece by a narrow slit 4 having a depth T and a length L. At each end of the handpiece 1 an adjusting screw 5 is provided transversally to the slit 4, the width of the dovetailed storage groove 3 thus being adjustable at both ends by the screws 5. A thumbpiece 6 is mounted on the guide bars in such a way that it can be displaced thereon by means of two guides 7 worked into it. A thumbplate 8 is connected with the guides 7 by six spring bows 9. Two entrainment devices 10 together with two stops 11 are shaped on the end of the lower side of the thumbplate 8. The storage groove 3 holds a strip of identification plates 12. For attaching the plates 12 to a workpiece the thumbplate 8 is moved forward with the thumb, i.e. toward the workpiece such as a distributor component, and at the same time downwards, as seen in the drawings, until the entrainment devices 10 engage two side gaps 13 situated in the zone of separation between two plates 12. The stops 11 prevent the thumbplate 8 from giving way toward the side. The strip with the plates 12 is now moved towards the workpiece by means of a thumbpiece 6 to the distance required to ensure that the first plate 12 partly projects beyond the relevant end of the storage groove 3. This plate 12 can then be moved down onto the receiving groove of the workpiece. The operation of accurately tracing the receiving groove is then carried out partly by feeling for it. This method enables the process to be carried out rapidly and reliably despite the difficulty of seeing the plate receiving groove. After the receiving groove has thus been traced the relevant plate 12 is completely inserted and then separated by pivoting the handpiece 1 to the side. For this purpose the line of separation between two neighboring plates in strips of such plates is constructed as a preset breaking point 56, see FIG. 16. Before the device is used the adjusting screws 5 are adjusted in such a way that the guide elements of the identification plates are prestressed or rather bent just to the extent required to ensure that they can be introduced into the receiving groove of a workpiece without difficulty.

Figure 4:
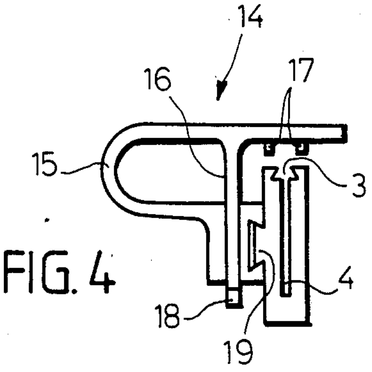
FIG. 4: A device with a spring bow.

FIG. 4 shows another thumbpiece 14 with a spring bow 15 in place of the six spring bows 9. By means of a slide 16 the entrainment devices 17 are caused to perform a certain defined movement. At the free end of the slide 16 is a spreading hook 18 serving as a stop. This construction requires only one guide bar 19 situated on the handpiece.

FIGS. 5 and 6 provide two views of a device for attaching identification plates, said device having a barrel-shaped handpiece 30, a thumbpiece guide 21 and a thumbpiece 22. On the outer surface of the handpiece 20 are a number of parallel storage grooves 3. At one end of the handpiece 20 is a stud 23 rotatably mounted in a bearing lug 24 of the guide 21. The stud 23 is secured in the axial direction by a shaft securing device 25. The stud 23 is provided on its outer surface with recesses which together with a ball 26, a spring 27 and a locking screw 28 form a detent system in such a way that the thumbpiece 22 engages each storage groove 3 when the handpiece 20 is rotated. The thumbpiece 22 is in principle constructed in accordance with the thumbpieces 7 and 14 and is provided on the lower side of the respective thumbplate with six entrainment devices 29. That end of the handpiece 20 which faces away from the stud 23 rests against a bearing bracket 30 shaped onto the guide 21 and having two bearing surfaces 31 and 32. Due to the provision of a number of storage grooves 3 on the handpiece 20, the operation of attaching plates with different identification details can be effected with one single device. The plates 12 are then selected by rotating a handpiece 20 relative to the thumbpiece 22. Due to the stud 23 at one end of the handpiece 20, the plates 12 to the stud 23. At this opposite end the storage grooves 3 are narrowed to a certain distance.

Figure 8A:
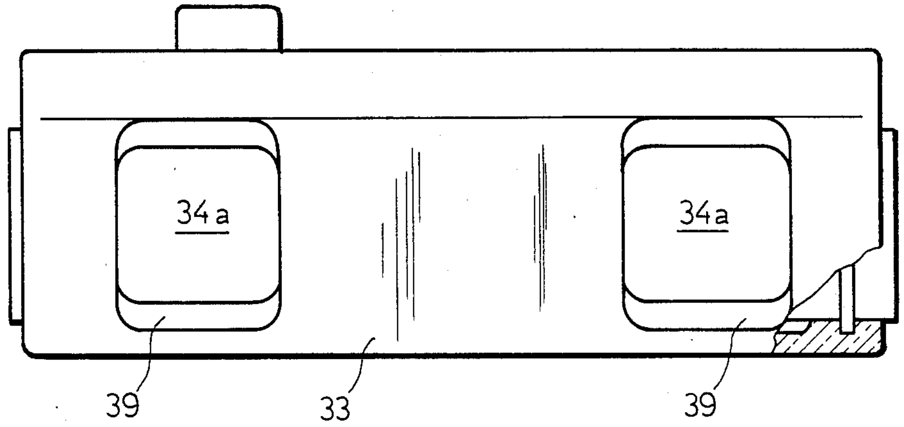
FIG. 8: View D of the device shown in FIG. 7.

FIGS. 7 and 8 show a further device in accordance with the invention, including a predominantly cylindrical housing 33 of transparent material serving as a handpiece in which a roller 34 with longitudinal storage grooves 3, is rotatably mounted. The storage grooves 3 are offset radially inwardly in relation to the outer diameter of the roller 34 by a distance s. The housing 33 is provided at the top, as seen in the diagram, with a longitudinal slit serving as a guide for the thumbpiece 35. A rotary knob 36 situated outside the housing 33 and on the right, as seen in the drawing is rigidly connected to the roller 34 and serves to select the plates 12 bearing the desired identification details. At the right-hand end of the housing 33, as seen in the drawing, is a detent with a spring 37 and a ball 38, which can engage depressions 36*a*. Due to the rotary knob 36 this device can only issue plates at its left-hand end, as seen in the diagram. A view of a device usable on both sides is shown in FIG. 8*a*. In this case the housing 33 has perforations 39, so that the roller 34*a* can be contacted directly for selecting the plates.

FIGS. 9 and 10 show a further embodiment of a device of this category, with a roller 40 provided with storage grooves serving as a handpiece, and having a thumbpiece 41. The thumbpiece 41 has an outer part provided with a thumbplate 42 and of an inner part 44 having two sliding pieces 45. The sliding pieces 45 engage guide groove 46 provided on the roller 40. Outer part 43 is rotatably mounted on the inner part 44 by means of a groove 43*a* provided on its inner surface and passing the whole way around. Sliding pieces 44*a* of the inner part 44 engage the groove 43*a*. The thumbpiece 41 thus forms a selector device provided with longitudinal and transversal guiding means.

FIGS. 11–13 show two cohesive identification plates 12 in three views with an approximately flat identification surface 47 and with a rear surface 48 having two expanded elastic guide elements 49 shaped onto it. Each of these guide elements has an attachment 50 with a slanting surface 51 forming a narrowed portion U. The plates 12 are injection molded of plastics material. The plates are manufactured in strips, each strip including a certain preselected number of cohesive plates 12. The connection between two neighboring plates 12 is constructed as a preset breaking point 52. The attachments 50 each project beyond the identification surface 47 by a distance m. When these plates are inserted with one of the devices described in the foregoing, the respective strip is in each case pushed forward to the distance required to ensure that the attachment 50 will project approximately by the distance m beyond the end of the device. This makes it considerably easier to find and enter the receiving groove.

FIGS. 14–16 again show two identification plates 12*a* interconnected at a preset breaking point 56, in three views, with an identification surface 53 and a rear surface 54, and with two expanded elastic guide elements 55 shaped thereon. These elements are offset toward the rear in relation to the identification surfaces 53 by a distance n. In addition, as may be seen from FIG. 15, the guide elements 55 are in each case provided with two chamfers f. This results in a narrowed portion V shown in FIG. 16. When these plates are inserted by one of the devices described in the foregoing, the strip in question is in all cases pushed forward to the distance required to ensure that the narrowed portion V projects beyond the relevant end of the device approximately by a distance of n+f. This facilitates the operation of binding and entering the receiving groove. The particular advantage of these plates 12*a* resides in the fact that they can be issued from both ends of the device.

One conceivably further development of the device, not shown herein, resides in the fact that for separating the plates a cutting device with a blade is provided, in which case the cutting device can be operated by means of a thumbpiece.

In a further development of the device, not shown here, the headpiece is provided with a pistol grip and an operating lever, in which case the operations of displacing the plates longitudinally and cutting them off can be affected by means of said operating lever.

In further conceivable embodiments of the device pneumatic or electric driving means are provided for the longitudinal displacement and separation of the plates.

Although the invention has been described with reference to specific example embodiments, it will be appreciated that it is intended to cover all modifications and equivalents within the scope of the appended claims.

What is claimed is:

1. A process for the attachment of identification plates to electrical distributor components having plate receiving groove means, wherein the identification plates are held by friction, comprising the following steps, (a) inserting of at least one strip including a number of interconnected identification plates (12, 12*a*) carrying certain information and having guide elements (49, 55), into a device for attaching the plates;

(b) pushing the strip forward inside the device until at least a visible part of said guide elements (49, 55) of a forward-most plate to be attached, extends out of the device;

(c) applying the device to said receiving groove means provided on the distributor component, whereby finding said receiving groove means is made easier by said guide elements which extend out of the device;

(d) pressing said guide elements toward each other immediately before insertion into said receiving groove means for biasing said guide elements toward each other;

(e) inserting of the plates (12, 12*a*) into said receiving groove means by means of the device; and (f) separating an inserted plate from the plates (12, 12*a*) forming said strip of plates in said device.

2. A device for inserting identification plates (12, 12*a*) into a receiving groove, particularly in electrical distributor components, whereby the identification plates (12, 12*a*) are secured by friction in said receiving groove, comprising a handpiece with at least one plate guide groove extending longitudinally through said handpiece for storing and guiding identification plates to be inserted in said receiving groove, a thumbpiece guided longitudinally of said handpiece for a longitudinal displacement of said identification plates present in said plate guide groove (3), said identification plates having opposite edges with a first spacing between said opposite edges, said handpiece further comprising means for adjusting a width of an outlet end of said guide groove to a second spacing slightly smaller than said first spacing for bending at least a portion of each identification plate into a shape easily fitting into said receiving groove as each identification plate is pushed through said outlet end of said guide groove by said thumbpiece for simultaneously inserting a bent identification plate exiting from said guide groove into said receiving groove when said thumbpiece is moved longitudinally relative to said guide groove.

3. The device of claim 3, wherein said adjusting means comprise an adjusting screw (5) for narrowing an outlet end of said guide groove in a selectable manner.

4. The device of claim 2, wherein said thumbpiece is longitudinally guided in said plate guide groove.

5. The device of claim 2, further comprising separate guide means for said thumbpiece including a thumbpiece guide groove or at least one guide bar, said thumbpiece having at least one entrainment device for engaging and pushing said identification plates stored in said plate guide groove.

6. The device of claim 2, comprising a number of plate guide grooves situated in parallel to one another in one plane within said handpiece.

7. The device of claim 2, wherein said handpiece has a cylindrical surface, said device comprising a number of storage grooves situated in parallel to one another in said cylindrical surface of said handpiece.

8. The device of claim 6, wherein said handpiece has a selector device with a longitudinal guide, a transversal guide, and a thumbplate.

9. The device of claim 7, wherein said handpiece has a selector device with a longitudinal guide, a transversal guide, and a thumbplate.

* * * * *

UNITED STATES PATENT AND TRADEMARK OFFICE

CERTIFICATE OF CORRECTION

PATENT NO. : 4,752,998

DATED : June 28, 1988

INVENTOR(S) : Safa Kirma, Reiner Wurth, Heinz Penz

It is certified that error appears in the above-identified patent and that said Letters Patent is hereby corrected as shown below:

Claim 3, line 1, replace "claim 3" by --claim 2--.

Signed and Sealed this

First Day of November, 1988

*Attest:*

DONALD J. QUIGG

*Attesting Officer*

*Commissioner of Patents and Trademarks*